(12) United States Patent
Fukudome et al.

(10) Patent No.: US 8,448,429 B2
(45) Date of Patent: May 28, 2013

(54) ENGINE EXHAUST HEAT RECOVERY DEVICE, AND ENERGY SUPPLY APPARATUS USING THE SAME

(75) Inventors: Jiro Fukudome, Osaka (JP); Masataka Sugimoto, Amagasaki (JP)

(73) Assignee: Yanmar Co., Ltd., Osaka-shi (JP)

( * ) Notice: Subject to any disclaimer, the term of this patent is extended or adjusted under 35 U.S.C. 154(b) by 638 days.

(21) Appl. No.: 12/734,099

(22) PCT Filed: Oct. 9, 2008

(86) PCT No.: PCT/JP2008/068334
§ 371 (c)(1),
(2), (4) Date: Apr. 9, 2010

(87) PCT Pub. No.: WO2009/048090
PCT Pub. Date: Apr. 16, 2009

(65) Prior Publication Data
US 2010/0205946 A1    Aug. 19, 2010

(30) Foreign Application Priority Data

Oct. 10, 2007  (JP) ................. 2007-264526
Dec. 26, 2007  (JP) ................. 2007-335152

(51) Int. Cl.
*F01N 3/02*  (2006.01)
*F01N 5/02*  (2006.01)

(52) U.S. Cl.
USPC ............................ 60/320; 60/298

(58) Field of Classification Search
USPC .................. 60/298, 320; 165/154, 155, 908
See application file for complete search history.

(56) References Cited

U.S. PATENT DOCUMENTS 3,997,002 A * 12/1976 Baker et al. ............. 165/154
4,694,894 A *  9/1987 Kito et al. .............. 165/135
5,052,190 A * 10/1991 Gregory .................. 62/225
5,157,935 A * 10/1992 Gregory .................. 62/278
6,702,190 B1 *  3/2004 Nohl et al. ............. 237/12.3 C
6,746,600 B2 *  6/2004 Nguyen ................ 210/167.06
2006/0054381 A1 *  3/2006 Takemoto et al. ........ 181/237

FOREIGN PATENT DOCUMENTS

| JP | 61-89697 A2 | 6/1986 |
| JP | 10-131744 A | 5/1998 |
| JP | 10-299464 A | 11/1998 |
| JP | 2002-372394 A | 12/2002 |
| JP | 2007-032561 A | 2/2007 |
| WO | WO-2006/012087 A2 | 2/2006 |

OTHER PUBLICATIONS

International Search Report dated Nov. 18, 2008, issued on PCT/JP2008/068334.

* cited by examiner

*Primary Examiner* — Thomas Denion
*Assistant Examiner* — Jason Shanske
(74) *Attorney, Agent, or Firm* — Edwards Wildman Palmer LLP

(57) ABSTRACT

[Problems] Provided is a configuration in which a member is not interposed between exhaust gas and a partition wall of an engine coolant passage, and the exhaust gas is caused to directly collide with the partition wall of the engine coolant passage, thus raising the gas flow velocity in a heat exchange part, which enables further improving the exhaust heat recovery rate.
[Means for Solving Problems] An engine exhaust gas heat recovery device (1) recovers heat from engine exhaust gas by performing heat exchange between the engine exhaust gas and engine coolant. A plurality of spray holes (20) facing an inner cylinder tube (31) of a coolant passage (3) have been provided in an outer tube (22) of an exhaust gas inflow tube (2), and the exhaust gas is caused to directly collide with the inner cylinder tube (31) of the coolant passage (3). A minimum distance from each of the spray holes (20) to the inner cylinder tube (31) of the coolant passage (3) is in a range of 1.5 to 7 times the diameter of the spray holes. A relationship between a total opening area of the spray holes (20) and an exhaust gas flow rate is (total spray hole area/exhaust gas mass flow rate)=2.0 to 4.5 ($cm^2$/(kg/min)).

18 Claims, 10 Drawing Sheets

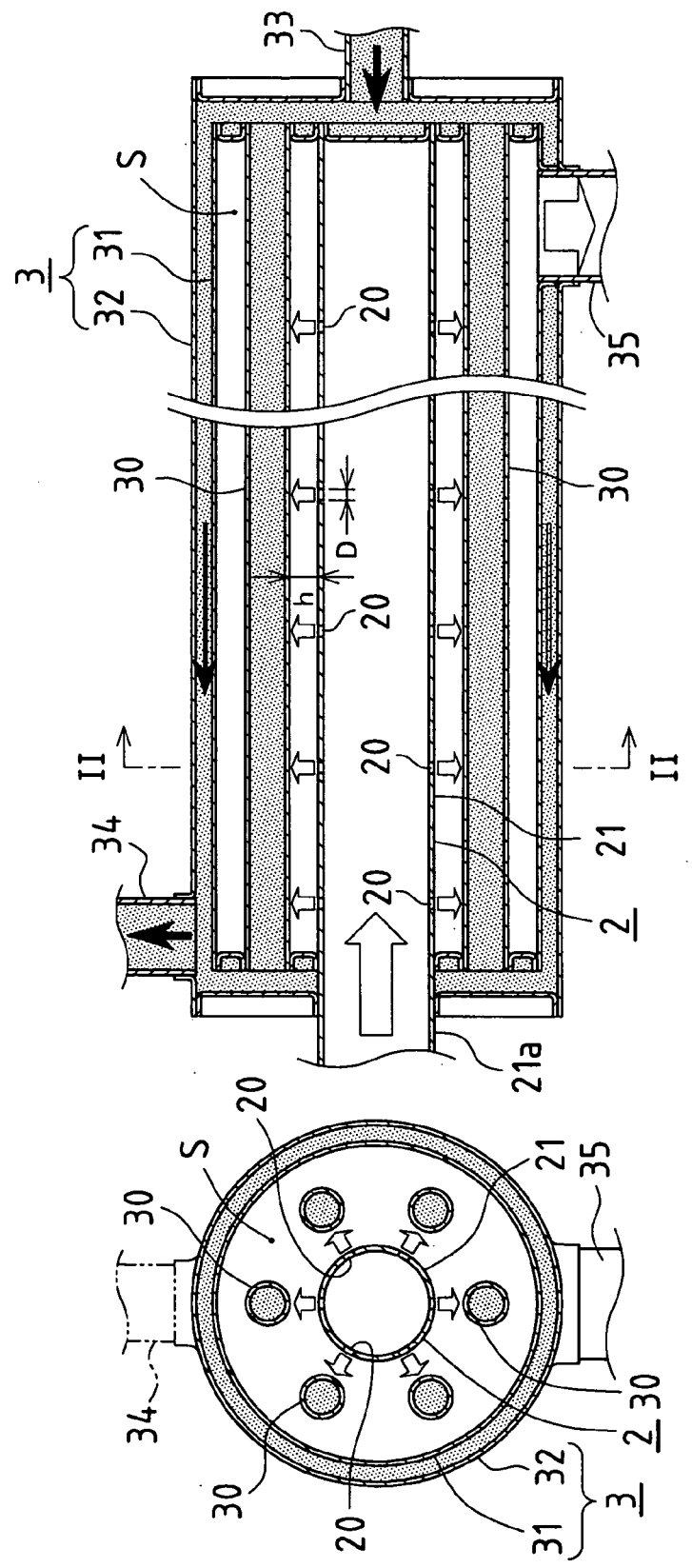

ENGINE EXHAUST HEAT RECOVERY DEVICE, AND ENERGY SUPPLY APPARATUS USING THE SAME

TECHNICAL FIELD

The present invention relates to an engine exhaust gas heat recovery device used in an engine-driven air conditioning device, a cogeneration system, or the like.

BACKGROUND ART

Conventionally, as an engine exhaust gas heat recovery device, there is known a configuration in which heat is recovered from engine exhaust gas by restricting the flow of exhaust gas through the provision of a baffle plate in an exhaust gas passage (see Patent Document 1).

However, the above conventional engine exhaust gas heat recovery device is constituted such that exhaust gas is restricted by a baffle plate, and the heat transmission route is from the exhaust gas to the baffle plate, then to a heat transmission tube or an inner cylinder part (both of which are partition walls of the engine coolant passage), and then to engine coolant. In other words, the baffle plate is interposed between the exhaust gas and the partition wall of the engine coolant passage, and to that extent, the kinetic energy of the exhaust gas flow rate is lost, and the exhaust heat recovery rate declines.

Also, the exhaust gas passage route becomes complex due to the baffle plate, and therefore in the exhaust gas passage route, the pressure loss increases and dew condensation water readily accumulates. Particularly, depending on the engine, if nitrogen oxides accumulate in the exhaust gas, there is concern that such nitrogen oxides will condense into nitric acids and corrode the exhaust gas passage route.

There is also known a configuration in which a catalyst is included in such an engine exhaust gas heat recovery device (see Patent Document 2).

However, in the above conventional engine exhaust gas heat recovery device, heat is recovered by merely covering the exhaust gas passage with a coolant jacket, and therefore it is necessary to bend the exhaust gas route into a complex shape in order to efficiently perform heat exchange between the exhaust gas and the coolant.

Accordingly, exhaust pressure loss increases, and manufacturing cost also rises. Also, since a catalyst is included in the middle of such a bent part, there is the disadvantage that the structure becomes complex.
Patent Document 1: JP 2002-372394A
Patent Document 2: JP H10-299464A

DISCLOSURE OF INVENTION

Problem to be Solved by the Invention

The present invention has been achieved in light of the current situation, and provides a configuration in which a member is not interposed between exhaust gas and a partition wall of an engine coolant passage, and the exhaust gas is caused to directly collide with the partition wall of the engine coolant passage, thus raising the gas flow velocity in a heat exchange part, which enables further improving the exhaust heat recovery rate.

The present invention also provides a configuration in which a catalyst is included in the above configuration without an increase in the complexity of the exhaust gas route, thereby enabling a reduction in exhaust pressure loss and manufacturing cost.

Means for Solving Problem

Specifically, an engine exhaust gas heat recovery device of the present invention is an engine exhaust gas heat recovery device that recovers heat from engine exhaust gas by performing heat exchange between the engine exhaust gas and engine coolant, a plurality of spray holes facing a partition wall of a coolant passage having been provided in a circumferential wall of an exhaust gas inflow tube, and the exhaust gas being caused to directly collide with the partition wall of the coolant passage.

In the above engine exhaust gas heat recovery device, a minimum distance from each of the spray holes to the partition wall of the coolant passage may be in a range of 1.5 to 7 times the diameter of the spray holes.

In the above engine exhaust gas heat recovery device, a relationship between a total opening area of the spray holes and an exhaust gas flow rate may be (total spray hole area/exhaust gas mass flow rate)=2.0 to 4.5 $(cm^2/(kg/min))$.

Also, an engine exhaust gas heat recovery device of the present invention is the above engine exhaust gas heat recovery device wherein a catalyst for engine exhaust gas cleanup has been disposed in an exhaust gas flow route of an exhaust gas inflow part, and part or an entirety of the catalyst is housed inside the exhaust gas inflow tube. Also, a notch part that enables gas distribution has been provided at one place or a plurality of places in a catalyst brace joined to the outer circumference of the catalyst.

Furthermore, an energy supply apparatus of the present invention is an energy supply apparatus such as an engine-driven heat pump or a cogeneration system in which any one of the above-described engine exhaust gas heat recovery devices is used in an exhaust gas route of an engine.

Effects of the Invention

According to the present invention, it is possible to improve the exhaust heat recovery rate.

Also, according to the present invention, the catalyst for engine exhaust gas cleaning is housed in the exhaust gas inflow tube, and the space between the inner wall of the heat recovery device and the outer wall of the heat recovery device is caused to be the engine coolant passage, thus enabling the omission of a bent part from the exhaust gas route, which enables reducing exhaust pressure loss as well as lowering manufacturing cost.

Furthermore, since the catalyst for engine exhaust gas cleanup is housed in the exhaust gas inflow tube, it is possible to cause the overall exhaust gas route to be compact, and lower the cost of the overall exhaust gas route compared to a configuration in which a catalyst housing member is provided separately.

BRIEF DESCRIPTION OF DRAWINGS

FIG. 6(a) is a cross-sectional diagram showing another embodiment of an engine exhaust gas heat recovery device according to the present invention, and FIG. 6(b) is a cross-sectional diagram taken along line II-II in FIG. 6(a).

Figure 1A:
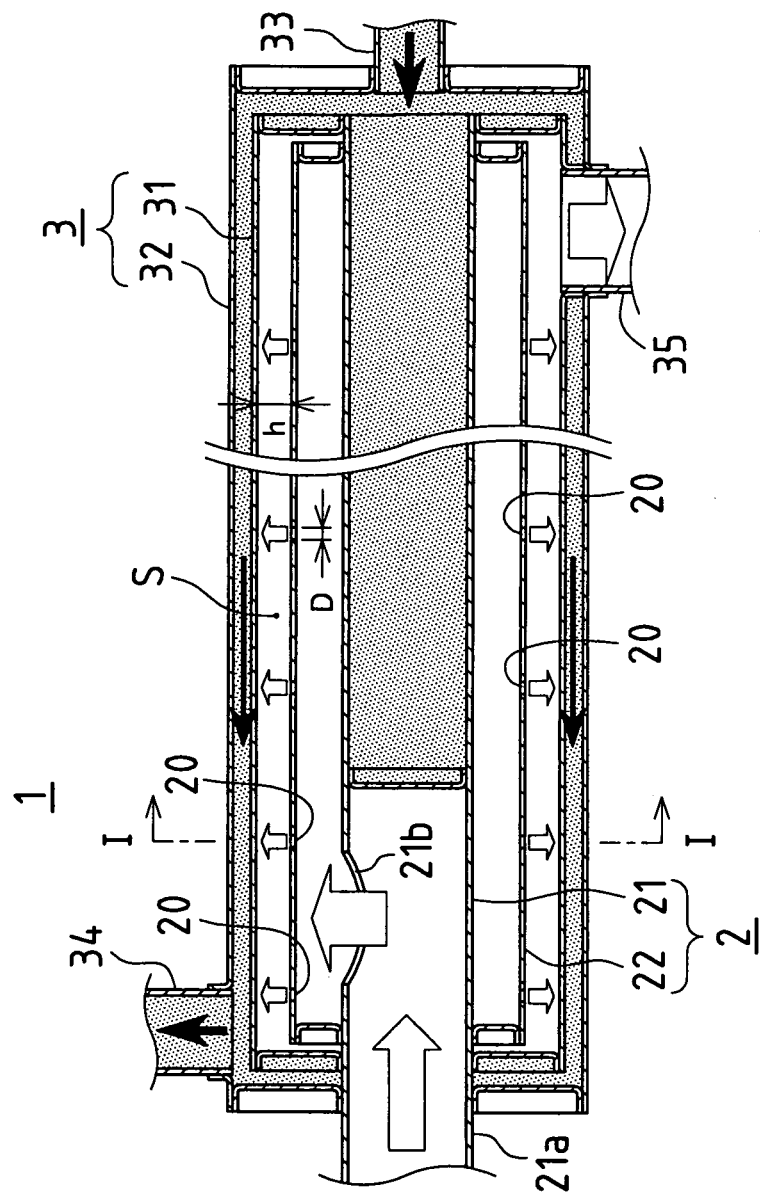
FIG. 1(*a*) is a cross-sectional diagram of an engine exhaust gas heat recovery device according to the present invention, and FIG. 1(*b*) is a cross-sectional diagram taken along line I-I in FIG. 1(*a*).

DESCRIPTION OF REFERENCE NUMERALS 1 engine exhaust gas heat recovery device
11 engine
2 exhaust gas inflow tube
20 spray hole
22 outer tube
3 coolant passage
31 inner cylinder tube (partition wall)
32 outer cylinder tube
4 catalyst for engine exhaust gas cleanup
41 support member (brace)
41b notch part

BEST MODE FOR CARRYING OUT THE INVENTION

The following describes embodiments of the present invention based on the drawings.

Engine Exhaust Gas Heat Recovery Device not Including a Catalyst

Figure 1B:
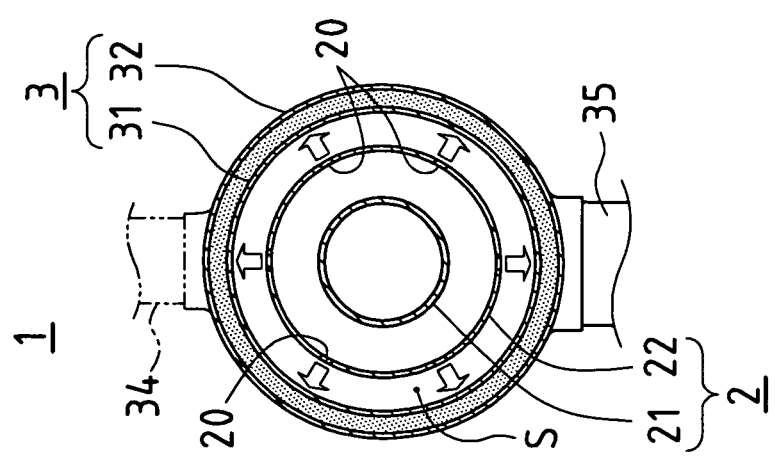
Figure 2:
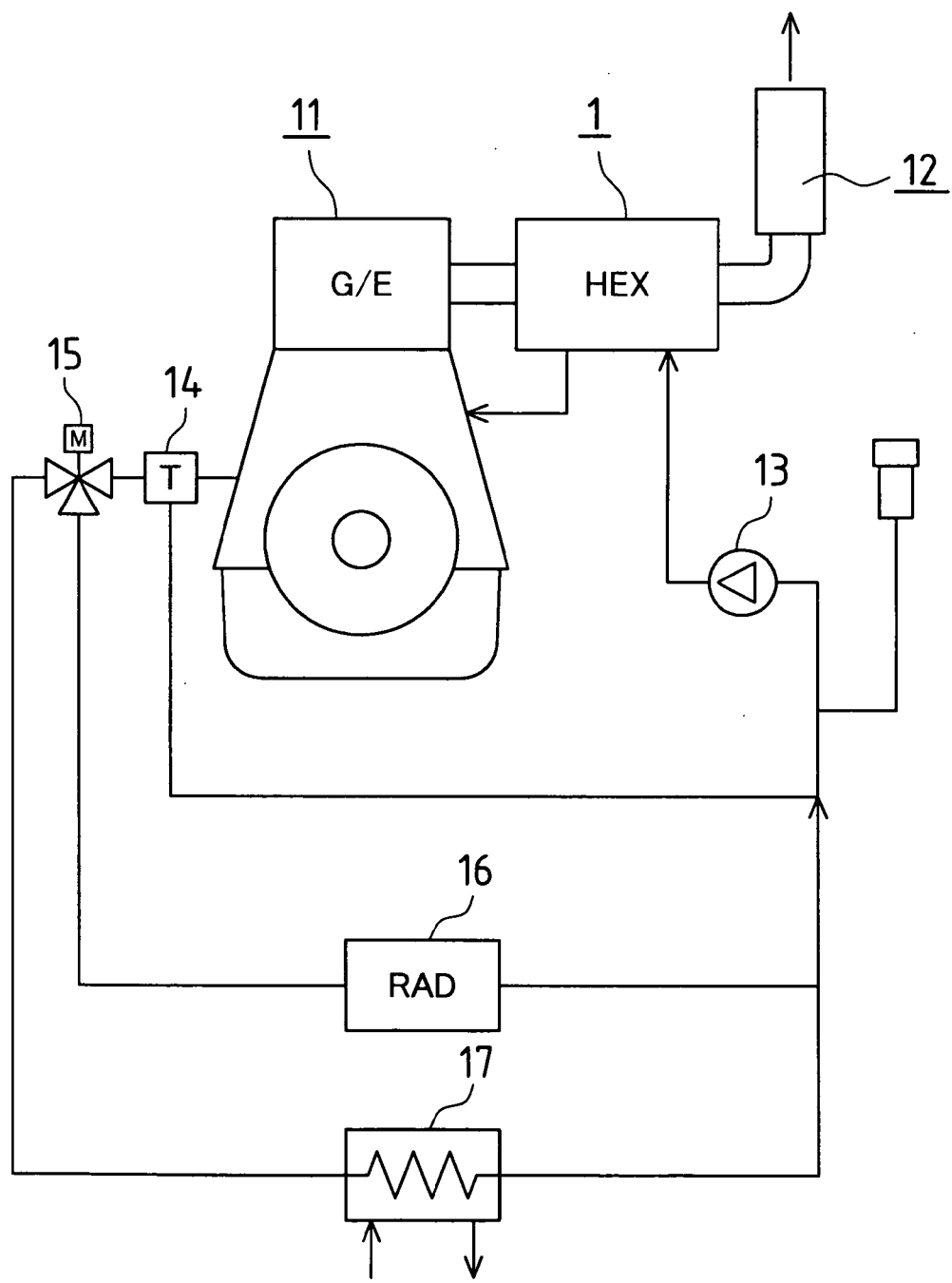
FIG. 2 is a diagram showing an engine coolant circuit provided with the engine exhaust gas heat recovery device shown in FIG. 1.

FIG. 1 shows an engine exhaust gas heat recovery device 1 according to the present invention, and FIG. 2 shows an example of a diagram of a coolant circuit of a gas engine 10 provided with the engine exhaust gas heat recovery device 1.

Specifically, in this engine exhaust gas heat recovery device 1, a plurality of spray holes 20 facing an inner cylinder tube 31 of a coolant passage 3 are provided in an outer, tube 22 of an exhaust gas inflow tube 2, and exhaust gas is caused to directly collide with the inner cylinder tube 31 of the coolant passage 3.

As shown in FIG. 2, the engine exhaust gas heat recovery device 1 is provided such that exhaust from an engine 11 that is bound for a silencer 12 passes through the exhaust gas inflow tube 2, and furthermore is provided such that coolant for the engine 11 passes through the coolant passage 3 before being introduced to the engine 11. The coolant circuit is configured such that coolant that has passed through the engine 11 is circulated by a pump 13. Also, the management of the temperature of the coolant is made possible by a thermostat 14, and the switching of the flow to a radiator 16 or a heat exchanger 17 is made possible by a three-way valve 15.

The exhaust gas inflow tube 2 has a double tube structure including an inner tube 21 and the outer tube 22, and one end side of the inner tube 21 is an inlet 21a through which exhaust gas flows in.

The inner tube 21 is obstructed at a position that is directly after exhaust gas has flown into the inlet 21a at the one end, and an opening part 21b is provided on the outer circumferential face on the inflow base end side before the position of such obstruction. Accordingly, exhaust gas flows in from the inlet 21a on the one side of the inner tube 21, and passes to the outer tube 22 via the opening part 21b.

The outer tube 22 is provided with a plurality of the spray holes 20 at regular intervals along the lengthwise direction and the circumferential direction. Accordingly, exhaust gas that has passed from the opening part 21b of the inner tube 21 to the outer tube 22 is ejected from these spray holes 20.

The coolant passage 3 is configured such that a space S exists between it and the exhaust gas inflow tube 2, and such that the space S covers the entirety of the exhaust gas inflow tube 2.

The coolant passage 3 has a double tube structure including the inner cylinder tube 31 and an outer cylinder tube 32, such that coolant flows in the gap therebetween, and a coolant inflow tube 33 is connected to an end face of the outer cylinder tube 32 on the other side, which is opposite from the exhaust gas inlet 21a of the exhaust gas inflow tube 2. Also, a drain tube 34 is connected to the outer circumferential face of the outer cylinder tube 32 on one side, and coolant that has flowed in from the inflow tube 33 and passed through the coolant passage 3 can be drained out from the drain tube 34. Furthermore, an exhaust tube 35 that penetrates through the inner cylinder tube 31 and the outer cylinder tube 32 is connected to the outer circumferential face of the coolant passage 3 on the other side, and exhaust gas that has been ejected from the spray holes 20 of the exhaust gas inflow tube 2 into the space S can be output via the exhaust tube 35.

According to the engine exhaust gas heat recovery device 1 configured as such, exhaust gas from the engine flows from the opening part 21b of the inner tube 21 to the outer tube 22 and is sprayed from the spray holes 20, and therefore exhaust gas can be sprayed at a high ejection velocity directly onto the inner cylinder tube 31 that is the sole partition wall between the exhaust gas and the coolant, without the kinetic energy of the gas flow rate of exhaust gas that has been sprayed from the spray holes 20 being reduced due to the interference of other members before reaching the coolant passage 3. Accordingly, coolant that passes through the coolant passage 3 can recover exhaust heat from exhaust gas with good thermal efficiency.

Also, with this exhaust gas heat recovery device 1, the passage route of exhaust gas does not become complicated due to a member such as a baffle plate as in conventional technology, and the gas passage route can be extremely simple, thereby enabling preventing the accumulation of exhaust gas, an increase in pressure loss, and the like. Accordingly, it is possible to prevent corrosion due to the production of dew condensation water and the production of nitric acids as a result of the condensation of nitrogen oxides, as well as to obtain superior durability.

Note that although the exhaust gas inflow tube 2 of the engine exhaust gas heat recovery device 1 has a double tube structure including the inner tube 21 and the outer tube 22 in the present embodiment, there is no particular limitation to such a double tube structure, and the configuration may be further simplified by providing the spray holes 20 directly in an exhaust gas inflow tube 2 that is a single tube.

Also, in the present embodiment, the exhaust gas inlet 21a and the coolant inflow tube 33 are provided so as to be opposite from each other at the end faces of the engine exhaust gas heat recovery device 1, and the coolant drain tube 34 and the exhaust gas exhaust tube 35 are provided at positions that are opposite from each other on the outer circumferential face of the engine exhaust gas heat recovery device 1, but what is most important in the present invention is that exhaust gas from the spray holes 20 is directly sprayed onto the inner cylinder tube 31 that is the partition wall between the exhaust gas and the coolant, and there is no particular limitation on the positions of provision of the other elements such as the above-described exhaust gas inlet 21a, the coolant inflow tube 33, the coolant drain tube 34, and the exhaust gas exhaust tube 35, and such positions may be modified appropriately.

Furthermore, although the ejection direction of exhaust gas ejected from the spray holes 20 is orthogonal to the inner cylinder tube 31 that is the partition wall in the present embodiment, there is no particular limitation to ejection in the orthogonal direction, and ejection from a diagonal direction is also possible.

Figure 3:
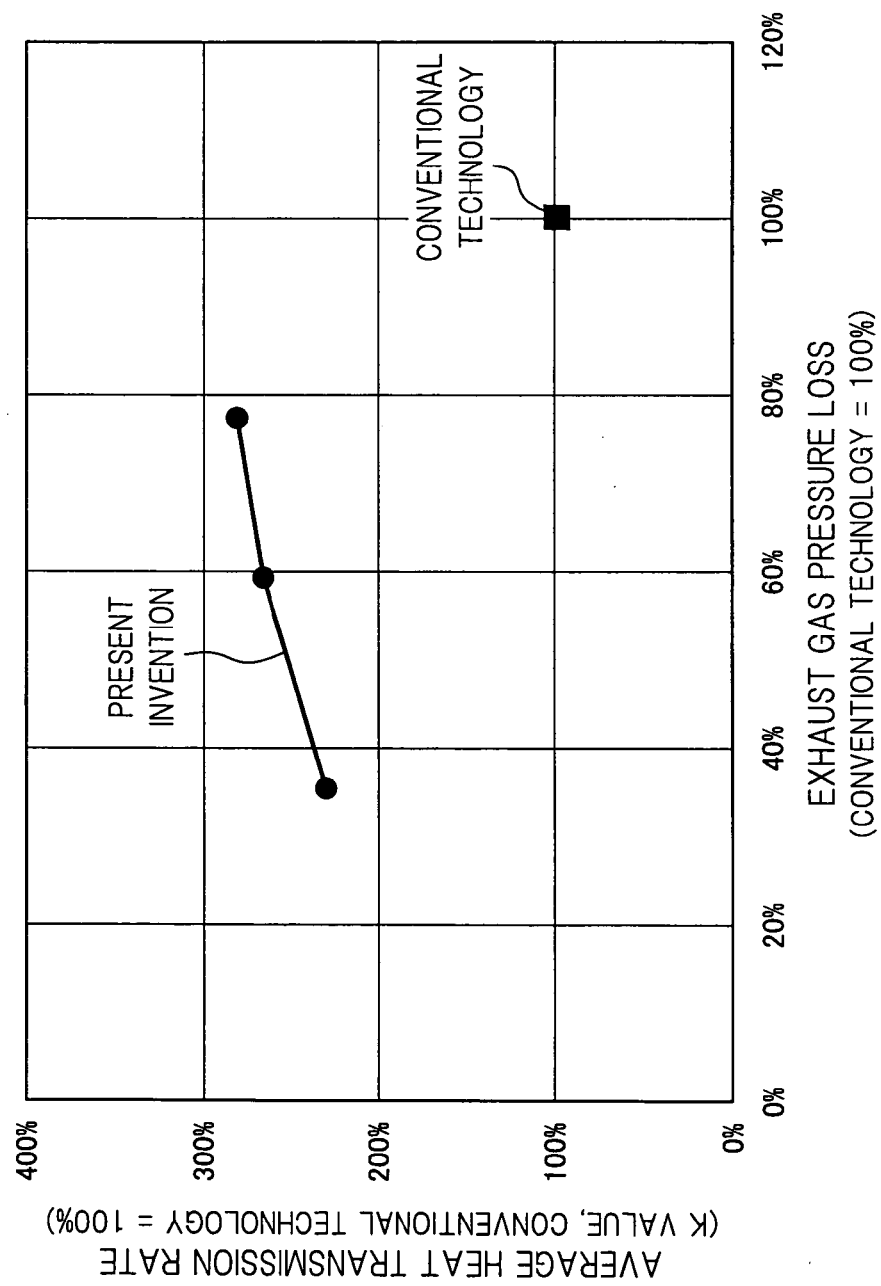
FIG. 3 is a graph showing a relationship that average heat transmission rate has with exhaust gas pressure loss of the engine exhaust gas heat recovery device according to the present invention.

FIG. 3 shows the relationship between average heat transmission rate (K value) and pressure loss of the exhaust gas heat recovery device 1 according to the present invention, in the case where 100% pressure loss is the pressure loss when using an exhaust gas heat recovery device (parts code 124593-13370, manufactured by Yanmar Corporation) that employs a baffle plate such as was described as conventional technology, in a gas engine (3GPG88, manufactured by Yanmar Corporation), and 100% average heat transmission rate (K value) is the average heat transmission rate (K value) at such time. The pressure loss of the exhaust gas heat recovery device 1 according to the present invention was adjusted by increasing/decreasing the number of spray holes 20. As a result, it was confirmed that in the exhaust gas heat recovery device 1 according to the present invention, even when the pressure loss was roughly 40% to 80% of the pressure loss of the conventional exhaust gas heat recovery device, an average heat transmission rate (K value) that is greater than or equal to two times the conventional rate could be obtained, and the exhaust heat recovery rate could be improved.

Figure 4:
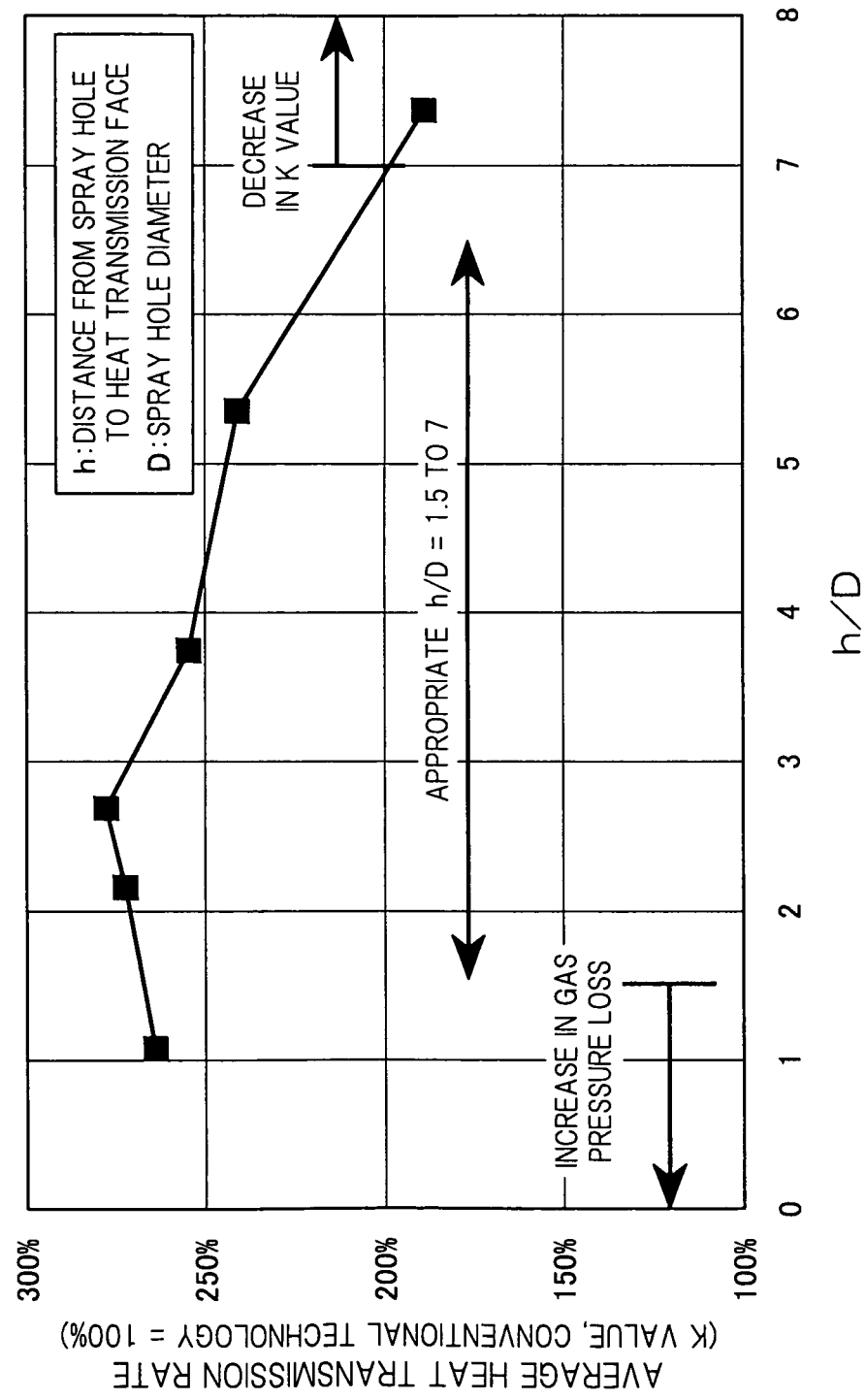
FIG. 4 is a graph showing a relationship that average heat transmission rate has with a ratio of the distance from a spray hole to an inner cylinder tube onto which exhaust gas therefrom is sprayed, to the diameter of the hole, in the engine exhaust gas heat recovery device according to the present invention.

FIG. 4 shows the relationship between average heat transmission rate (K value) and a ratio (h/D) in the exhaust gas heat recovery device 1 according to the present invention when such ratio has been modified appropriately, the ratio (h/D) being the ratio of a distance h between each spray hole 20 and the inner cylinder tube 31 onto which exhaust gas therefrom is sprayed, to a diameter D of the spray holes 20. Likewise to the case in the above-described FIG. 3, 100% average heat transmission rate (K value) is the average heat transmission rate (K value) when using an exhaust gas heat recovery device (parts code 124593-13370, manufactured by Yanmar Corporation) that employs a baffle plate such as was described as conventional technology, in a gas engine (3GPG88, manufactured by Yanmar Corporation).

As a result, it was confirmed that by keeping this ratio (h/D) in the range of 1.7 to 7, it is possible to sustain the collision velocity of exhaust gas on the inner cylinder tube 31, and improve the exhaust heat recovery rate, as well as simultaneously prevent a rise in exhaust gas pressure loss. When this ratio (h/D) is less than 1.7, the exhaust gas pressure loss rises. Also, when this ratio (h/D) exceeds 7, an effect can be achieved, but it is not possible to achieve an average heat transmission rate (K value) that is greater than or equal to two times the conventional rate, which is the target.

Figure 5:
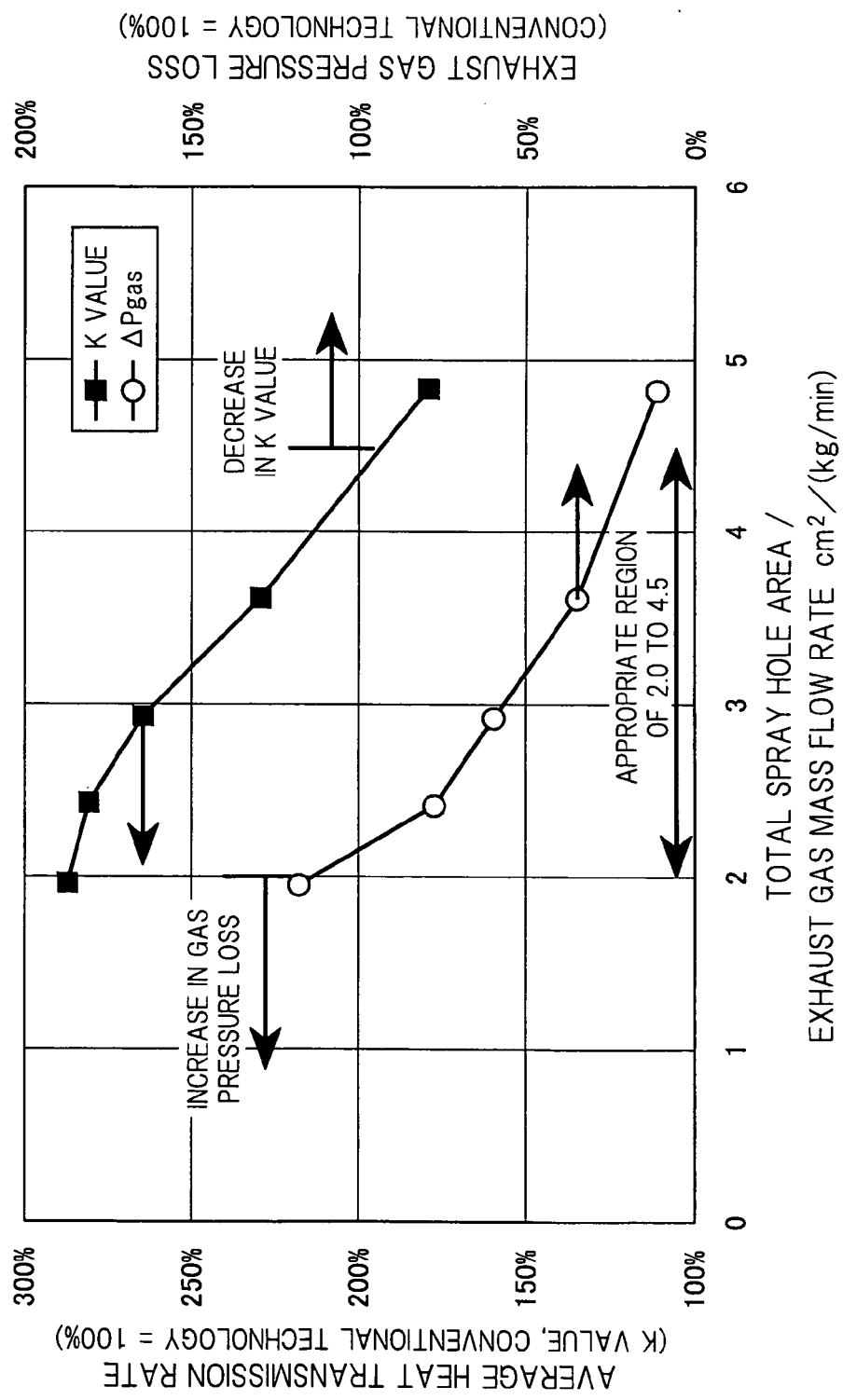
FIG. 5 is a graph showing relationships that average heat transmission rate and exhaust gas pressure loss have with a ratio of total spray hole area to exhaust gas mass flow rate in the engine exhaust gas heat recovery device according to the present invention.

FIG. 5 shows the relationships that average heat transmission rate (K value) and exhaust gas pressure loss have with a ratio of the total area of the spray holes 20 to the exhaust gas mass flow rate in the exhaust gas heat recovery device 1 according to the present invention, when such ratio has been modified appropriately. Likewise to the case in the above-described FIG. 3, 100% average heat transmission rate (K value) and 100% pressure loss are the average heat transmission rate (K value) and pressure loss when using an exhaust gas heat recovery device (parts code 124593-13370, manufactured by Yanmar Corporation) that employs a baffle plate such as was described as conventional technology, in a gas engine (3GPG88, manufactured by Yanmar Corporation).

As a result, it was confirmed that by keeping this ratio in the range of 2.0 to 4.5, it is possible to properly keep the collision velocity of exhaust gas on the inner cylinder tube 31, and improve the exhaust heat recovery rate (K value), as well as simultaneously prevent a rise in exhaust gas pressure loss. When this ratio is less than 2.0, the exhaust gas pressure loss rises. Also, when this ratio exceeds 4.5, an effect can be achieved, but it is not possible to achieve an average heat transmission rate (K value) that is greater than or equal to two times the conventional rate, which is the target.

Note that although exhaust gas is sprayed from the spray holes 20 onto the inner cylinder tube 31 of the coolant passage 3 in the present embodiment, as long as exhaust gas can be directly sprayed from the spray holes 20 onto the partition wall of the passage through which coolant flows, there is no particular limitation to this kind of exhaust gas heat recovery device 1, and the exhaust gas heat recovery device 1 may be as shown in FIG. 6 for example. Specifically, in this exhaust gas heat recovery device 1, the space S has been widened by omitting the outer tube 22 of the exhaust gas inflow tube 2 so that the configuration includes only the inner tube 21, a plurality of coolant tubes 30 through which coolant flows in the same way as coolant flows through the coolant passage 3 have been provided in the space S, and exhaust gas is sprayed from the spray holes 20 that are provided in the inner tube 21 onto the coolant tubes 30. In FIG. 6, members that are the same as in the exhaust gas heat recovery device 1 shown in FIG. 1 have been given the same reference signs, and descriptions thereof have been omitted.

Engine Exhaust Gas Heat Recovery Device Including a Catalyst

The following describes an embodiment of the present invention based on the drawings.

Figure 7B:
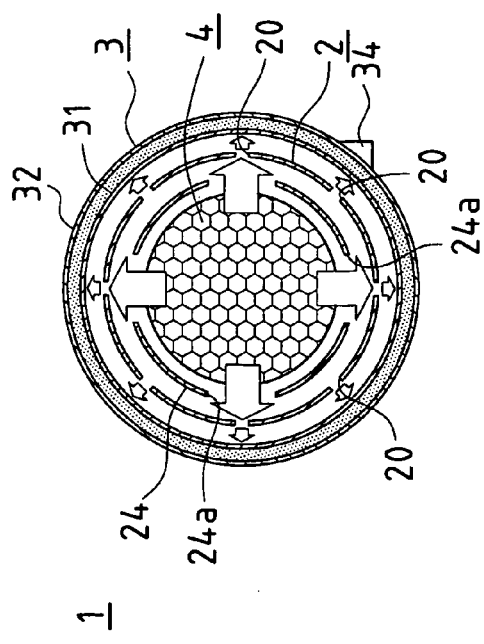
FIG. 7(b) is a cross-sectional diagram taken along line III-III in FIG. 7(a).
Figure 7A:
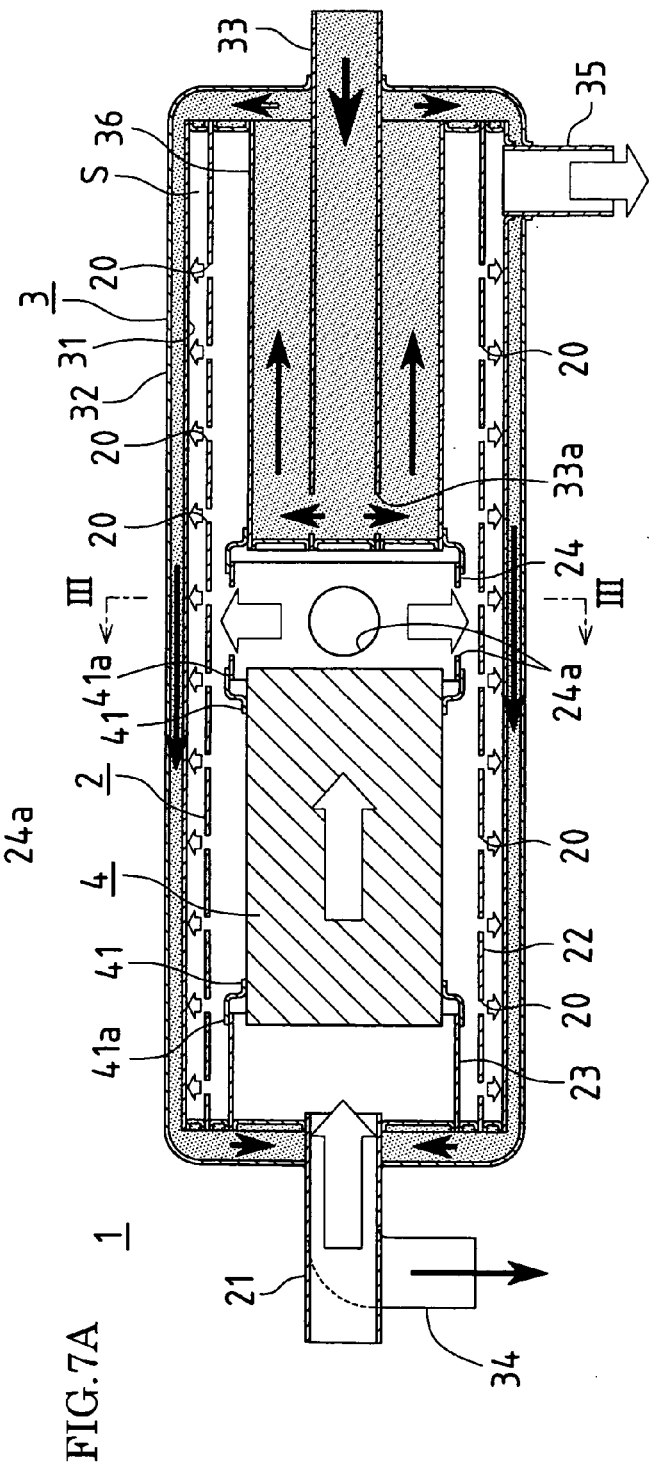
FIG. 7(a) is a cross-sectional diagram of an engine exhaust gas heat recovery device that includes a catalyst according to the present invention.

FIG. 7 shows an engine exhaust gas heat recovery device 1 according to the present invention.

Specifically, this engine exhaust gas heat recovery device 1 is configured such that a catalyst for engine exhaust gas cleanup (hereinafter, simply called a catalyst) 4 is housed in the outer tube 22 of the exhaust gas inflow tube 2, and the plurality of spray holes 20 provided in this outer tube 22 are opposite from the inner cylinder tube 31 of the coolant passage 3. Note that members that are the same as in the engine exhaust gas heat recovery device 1 shown in FIG. 1 described above have been given the same reference signs, and descriptions thereof have been omitted.

The catalyst 4 may be at least one of a three-way catalyst, an oxidation catalyst, and a reduction catalyst, or a mixture or series configuration of a plurality of catalysts. This catalyst 4 can be formed into a tube shape through which air can flow from one end to the other end. The interior may have a honeycomb structure through which air can flow, and a configuration is possible in which a catalyst processed so as to be pellet-shaped is provided in the tubular interior such that air can flow.

The outer tube 22 of the exhaust gas inflow tube 2 is formed into a cylindrical shape whose diameter enables the inclusion of the catalyst 4 described above, and the circumferential wall thereof is provided with the plurality of spray holes 20 at regular intervals along the lengthwise direction and the circumferential direction.

One end part inside this outer tube 22 is provided with a catalyst connection tube 23 that guides exhaust gas from the inner tube 21 of the gas inflow tube 2 into the outer tube 22 and that is an exhaust gas route, and a central part inside this outer tube 22 is provided with a gas emission tube 24 in which gas emission holes 24a have been formed dispersed at four places in the circumferential direction.

The previously-described catalyst 4 is provided between the catalyst connection tube 23 and the gas emission tube 24 of this outer tube 22. Specifically, the end parts of the catalyst 4 are each provided with a support member 41 that has an expanded diameter part 41a, and the catalyst 4 is provided such that the inner sides of the expanded diameter parts 41a of these support members 41 receive the insertion of the catalyst connection tube 23 and the gas emission tube 24 respectively, thus being connected thereto.

The coolant passage 3 is provided with a core tube 36 at the other end side so as to extend from the inner side of the outer tube 22 of the above-described exhaust gas inflow tube 2 to the location of the gas emission tube 24. Also, a coolant inflow tube 33 is provided so as to extend from the other end part of the coolant passage 3, and this coolant inflow tube 33 is configured such that coolant flows in from the other end part side of the coolant passage 3 toward the gas emission tube 24, then flows toward the core tube 36 through an opening part 33a formed in the coolant inflow tube 33 on the downstream side of the inflow, and then the coolant that has flowed into the core tube 36 again flows toward the other end part side of the coolant passage 3, and thereafter flows to the gap between the inner cylinder tube 31 and the outer cylinder tube 32.

According to the engine exhaust gas heat recovery device 1 configured as such, exhaust gas from the engine flows from the inner tube 21 of the exhaust gas inflow tube 2, through the catalyst connection tube 23, the catalyst 4, and the gas emission tube 24, is emitted from the gas emission holes 24a in this gas emission tube 24 into the outer tube 22, and is sprayed from the spray holes 20 in this outer tube 22 into the coolant passage 3, and therefore exhaust gas can be sprayed at a high ejection velocity directly onto the inner cylinder tube 31 that is the sole partition wall between the exhaust gas and the coolant, without the kinetic energy of the gas flow rate of the exhaust gas sprayed from these spray holes 20 being impaired due to the interference of other members before reaching the coolant passage 3. Accordingly, coolant that passes through the coolant passage 3 can recover exhaust heat from exhaust gas with good thermal efficiency, without the wasteful formation of a bent part as in conventional technology.

Also, the catalyst 4 is provided inside the outer tube 22 of the exhaust gas inflow tube 2, and therefore the exhaust route can be made more compact since space is not wastefully taken up, and the configuration can be more compact compared to the case in which the catalyst 4 is provided separately, and furthermore, it is possible to reduce cost due to the simplification of the structure, and prevent the accumulation of exhaust gas, an increase in pressure loss, and the like.

Also, due to the catalyst 4 being provided inside the outer tube 22 of the exhaust gas inflow tube 2, high-temperature gas flows in the vicinity of the catalyst, and the catalyst is not directly cooled by coolant, thereby preventing a reduction in the temperature of the catalyst 4 and enabling an improvement in conversion efficiency and a reduction in the size of the catalyst 4.

Figure 8B:
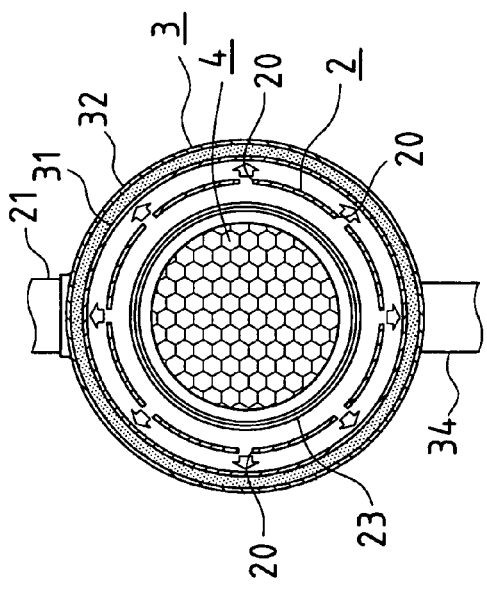
FIG. 8(b) is a cross-sectional diagram taken along line IV-IV in FIG. 8(a).
Figure 8A:
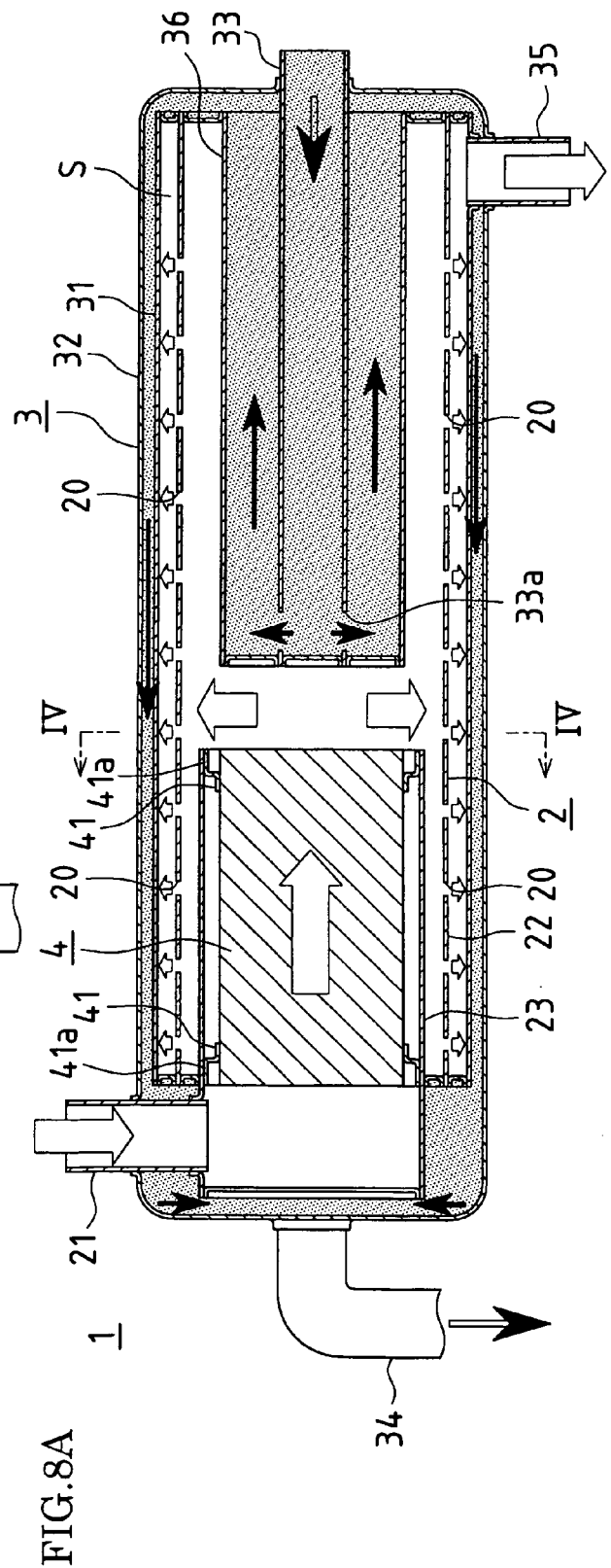
FIG. 8(a) is a cross-sectional diagram showing another embodiment of an engine exhaust gas heat recovery device that includes a catalyst according to the present invention.

Note that although the catalyst 4 of the engine exhaust gas heat recovery device 1 is provided between the catalyst connection tube 23 and the gas emission tube 24 in the present embodiment, a configuration is possible in which, as shown in FIG. 8, the catalyst connection tube 23 provided at the one end part inside the outer tube 22 extends both inward and outward of the outer tube 22 from the one end part, the gas emission tube 24 is omitted, and the catalyst 4 is provided inside the portion of the catalyst connection tube 23 that extends into the outer tube 22.

In FIG. 8, members that are the same as in FIG. 7 have been given the same reference signs, and descriptions thereof have been omitted.

In the case of this structure, the structure of the engine exhaust gas heat recovery device 1 can be simplified by further omitting the gas emission tube 24 from the configuration.

Figure 9B:
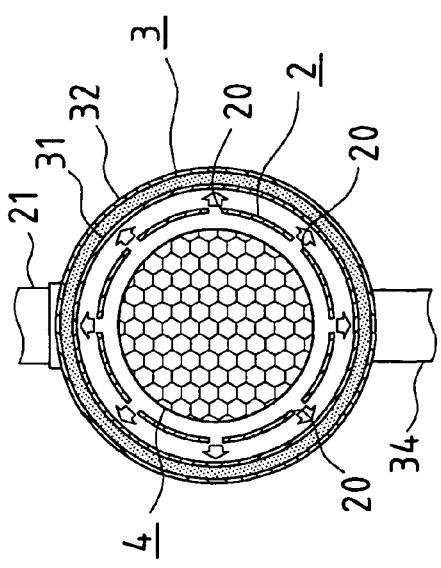
FIG. 9(b) is a cross-sectional diagram taken along line V-V in FIG. 9(a).
Figure 9A:
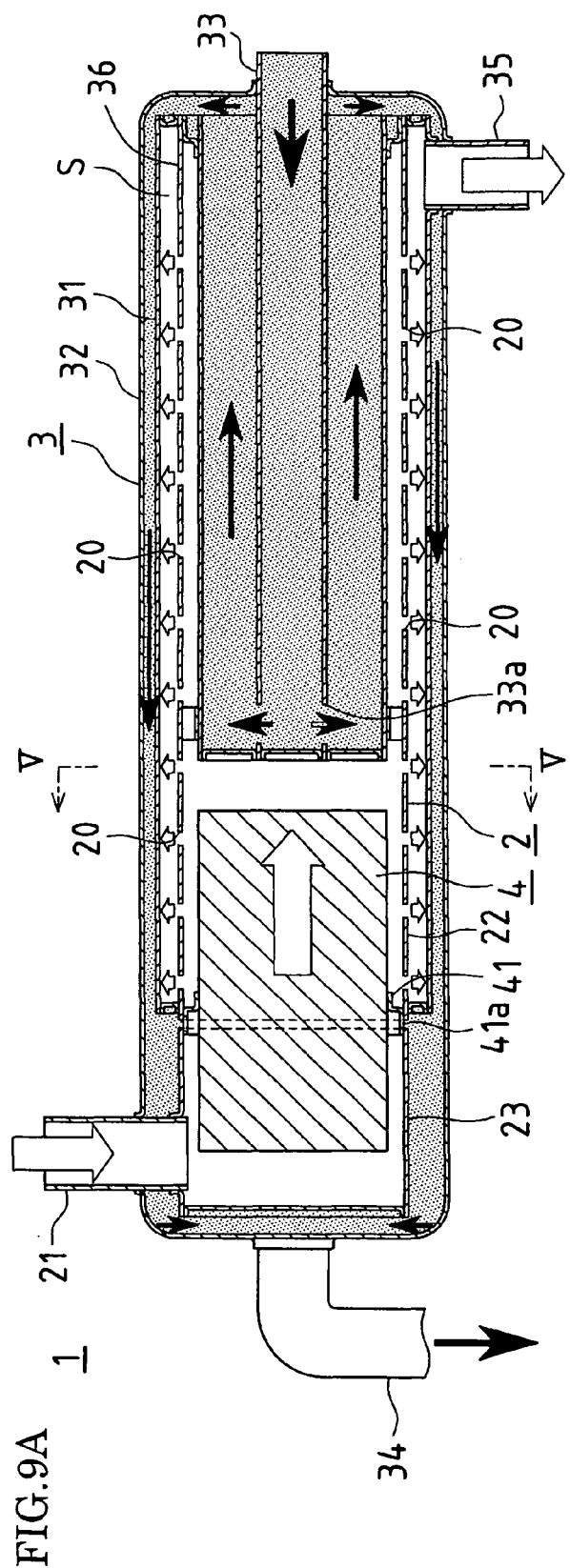
FIG. 9(a) is a cross-sectional diagram showing yet another embodiment of an engine exhaust gas heat recovery device that includes a catalyst according to the present invention.

Also, although the catalyst 4 is attached with use of the support members 41 that are provided at respective end parts of the catalyst 4 in the present embodiment, a configuration is possible in which, as shown in FIG. 9, the catalyst connection tube 23 is provided so as to extend only outward of the outer tube 22 from the one end part of the outer tube 22, and only a central part of the catalyst 4 is attached to the catalyst connection tube 23 by a single support member 41 that is provided in the proximity of the one end part.

In FIG. 9, members that are the same as in FIG. 7 have been given the same reference signs, and descriptions thereof have been omitted.

In the case of this structure, the structure of the engine exhaust gas heat recovery device 1 can be further simplified by omitting the portion of the catalyst connection tube 23 provided extending into the outer tube 22.

Figure 10B:
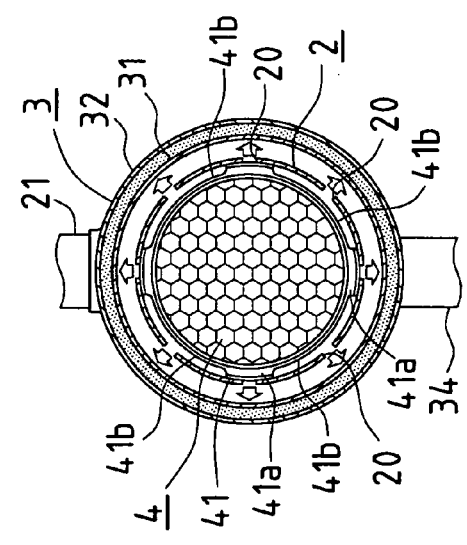
FIG. 10(b) is a cross-sectional diagram taken along line VI-VI in FIG. 10(a).
Figure 10A:
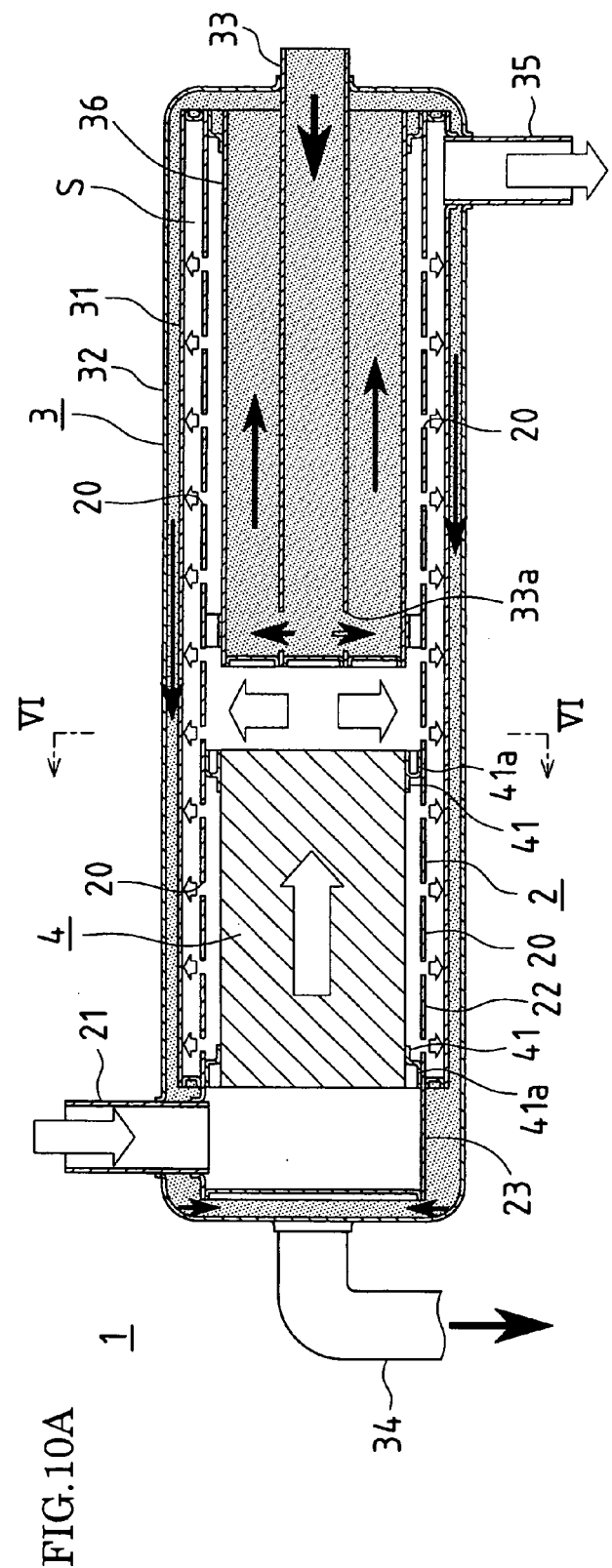
FIG. 10(a) is a cross-sectional diagram showing still another embodiment of an engine exhaust gas heat recovery device that includes a catalyst according to the present invention.

Furthermore, although the catalyst 4 is attached inside the outer tube 22 with use of the catalyst connection tube 23 in the present embodiment, a configuration is possible in which, as shown in FIG. 10, a catalyst connection tube 23 having the same diameter as the outer tube 22 is provided so as to extend outward from the one end part of the outer tube 22, and the catalyst 4 is directly attached to the outer tube 22 by the provision of the support members 41 inside the outer tube 22.

Note that in this case, the flow of exhaust gas is hindered by the support members 41, and therefore it is necessary to retain the exhaust gas route by providing notch parts 41b in the extended diameter parts 41a of the support members 41. Also, the total area of the cross-sectional area of the notch parts 41b is preferably set to be greater than or equal to two times the total area of the spray holes 20 in the outer tube 22 that are provided between the support members 41.

In FIG. 10, members that are the same as in FIG. 7 have been given the same reference signs, and descriptions thereof have been omitted.

According to this structure, in the engine exhaust gas heat recovery device 1, the structure inside the outer tube 22 can be further simplified, and furthermore it is possible to effectively utilize the space inside the outer tube 22 and utilize a large-diameter catalyst 4.

INDUSTRIAL APPLICABILITY

The present invention can be used as an exhaust gas heat recovery device in various types of engines that are used in air conditioning apparatuses and cogeneration systems.

The invention claimed is:

1. An engine exhaust gas heat recovery device that recovers heat from exhaust gas from an engine by performing heat exchange between the exhaust gas and engine coolant,
    a plurality of spray holes facing a partition wall of a coolant passage having been provided in a circumferential wall of an exhaust gas inflow tube, being configured such that a total volume of the exhaust gas is guided in a radial direction by the provision of an obstruction part at an exhaust gas inflow direction end of the exhaust gas inflow tube, a coolant inflow inlet having been provided in a face opposite from an exhaust gas inflow inlet in the exhaust gas inflow direction, the coolant passage having been provided up to the exhaust gas inflow inlet side, the spray holes having been provided from the exhaust gas inflow inlet side to the coolant inflow inlet side in the exhaust gas inflow direction, and the total volume of the exhaust gas being caused to directly collide with the partition wall of the coolant passage in all areas in the exhaust gas inflow direction.

2. The engine exhaust gas heat recovery device according to claim 1,
    wherein a minimum distance from each of the spray holes to the partition wall of the coolant passage is in the range of 1.5 to 7 times the diameter of the spray holes.

3. The engine exhaust gas heat recovery device according to claim 1,
    wherein a relationship between a total opening area of the spray holes and an exhaust gas flow rate is (total spray hole area/exhaust gas mass flow rate)=2.0 to 4.5 ($cm^2$/(kg/min)).

4. The engine exhaust gas heat recovery device according to claim 1,
    wherein a catalyst for engine exhaust gas cleanup has been disposed in an exhaust gas flow route of an exhaust gas inflow part, and part or an entirety of the catalyst is housed inside the exhaust gas inflow tube in which the spray holes are provided.

5. The engine exhaust gas heat recovery device according to claim 4,
    wherein a notch part that enables gas distribution has been provided at one place or a plurality of places in a catalyst brace joined to the outer circumference of the catalyst.

6. An energy supply apparatus including at least one of an engine-driven heat pump or a cogeneration system in which the engine exhaust gas heat recovery device according to claim 1 is used in an exhaust gas route of an engine.

7. The engine exhaust gas heat recovery device according to claim 2,
    wherein a catalyst for engine exhaust gas cleanup has been disposed in an exhaust gas flow route of an exhaust gas inflow part, and part or an entirety of the catalyst is housed inside the exhaust gas inflow tube in which the spray holes are provided.

8. The engine exhaust gas heat recovery device according to claim 3,
    wherein a catalyst for engine exhaust gas cleanup has been disposed in an exhaust gas flow route of an exhaust gas inflow part, and part or an entirety of the catalyst is housed inside the exhaust gas inflow tube in which the spray holes are provided.

9. An energy supply apparatus including at least one of an engine-driven heat pump or a cogeneration system in which the engine exhaust gas heat recovery device according to claim 2 is used in an exhaust gas route of an engine.

10. An energy supply apparatus including at least one of an engine-driven heat pump or a cogeneration system in which the engine exhaust gas heat recovery device according to claim 3 is used in an exhaust gas route of an engine.

11. An energy supply apparatus including at least one of an engine-driven heat pump or a cogeneration system in which the engine exhaust gas heat recovery device according to claim 4 is used in an exhaust gas route of an engine.

12. An energy supply apparatus including at least one of an engine-driven heat pump or a cogeneration system in which the engine exhaust gas heat recovery device according to claim 5 is used in an exhaust gas route of an engine.

13. An energy supply apparatus including at least one of an engine-driven heat pump or a cogeneration system in which the engine exhaust gas heat recovery device according to claim 7 is used in an exhaust gas route of an engine.

14. An energy supply apparatus including at least one of an engine-driven heat pump or a cogeneration system in which the engine exhaust gas heat recovery device according to claim 8 is used in an exhaust gas route of an engine.

15. The engine exhaust gas heat recovery device according to claim 7,
    wherein a notch part that enables gas distribution has been provided at one place or a plurality of places in a catalyst brace joined to the outer circumference of the catalyst.

16. The engine exhaust gas heat recovery device according to claim 8,
    wherein a notch part that enables gas distribution has been provided at one place or a plurality of places in a catalyst brace joined to the outer circumference of the catalyst.

17. An energy supply apparatus including at least one of an engine-driven heat pump or a cogeneration system in which the engine exhaust gas heat recovery device according to claim 15 is used in an exhaust gas route of an engine.

18. An energy supply apparatus including at least one of an engine-driven heat pump or a cogeneration system in which the engine exhaust gas heat recovery device according to claim 16 is used in an exhaust gas route of an engine.

* * * * *